United States Patent [19]

Piepenbrink

[11] 3,815,441

[45] June 11, 1974

[54] TABLE ACTUATED CUTTER GUARD

[75] Inventor: Maurice V. Piepenbrink, Huntington, Ind.

[73] Assignee: Caswell-Runyan Company, Inc., Huntington, Ind.

[22] Filed: Feb. 23, 1973

[21] Appl. No.: 335,241

[52] U.S. Cl. .............................................. 74/615
[51] Int. Cl. ............................................ F16p 3/04
[58] Field of Search ....... 74/612, 613, 615; 192/133

[56] References Cited
UNITED STATES PATENTS

| 1,265,058 | 5/1918 | Cooper | 74/615 |
| 2,240,983 | 5/1941 | Conine | 74/613 X |
| 2,383,221 | 8/1945 | Skoog | 74/615 |
| 2,683,515 | 7/1954 | Horn et al. | 74/615 X |

FOREIGN PATENTS OR APPLICATIONS

| 558,537 | 1/1944 | Great Britain | 74/615 |

Primary Examiner—Allan D. Hermann
Attorney, Agent, or Firm—Woodard, Weikart, Emhardt & Naughton

[57] ABSTRACT

A guard surrounding a machine cutter which is movable away from the cutter upon movement of the work support table to a position adjacent the cutter. A frame mounted to the machine has a slide movably mounted thereon. A shield extending partially around the cutter is fixedly mounted to the slide. A stop mounted to the frame limits its downward movement of the slide and shield. A flange mounted to the table contacts and lifts the slide to move the shield away from the cutter as the table moves upwardly adjacent to the cutter.

7 Claims, 6 Drawing Figures

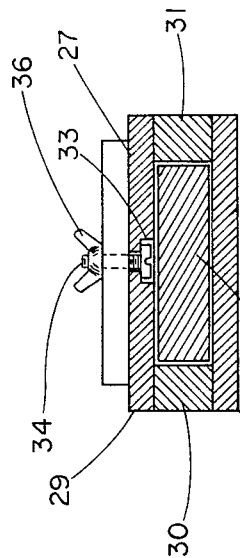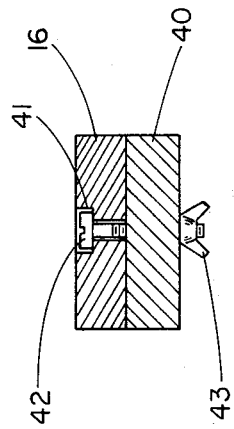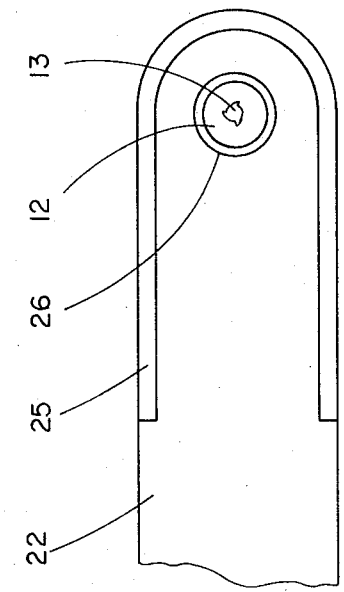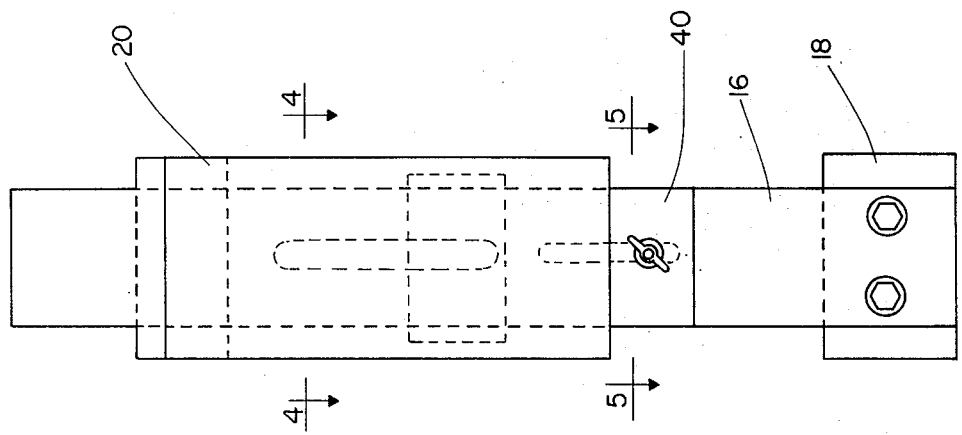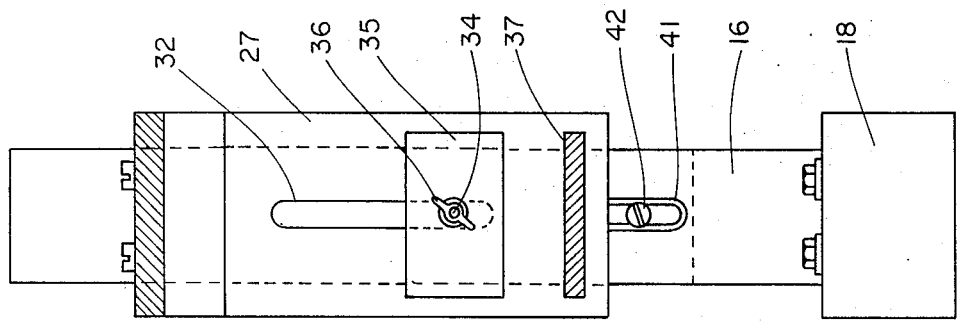

TABLE ACTUATED CUTTER GUARD

BACKGROUND OF THE INVENTION

1. Field of the Invention:

This invention is in the field of machine safety devices.

2. Description of the Prior Art:

Various regulations of the occupational safety and health administration of the United States Department of Labor require various safety devices on machine tools. One such regulation pertains to protecting the operator of a machine tool from accidentally contacting the actual cutting tool. Disclosed herein is a new guard for a machine having a cutting tool and a movable work piece table.

SUMMARY OF THE INVENTION

One embodiment of the present invention is a guard for a machine having a cutting tool and a movable work piece table comprising a main frame mounted to the machine, a slide movably mounted to the main frame, a shield mounted on the slide and extending at least partially around the cutting tool, first stop means operable to limit downward motion of the slide with respect to the frame and second means on the slide operable to move the slide and shield upwardly as the table moves upwardly adjacent the cutting tool.

One object of the present invention is to provide a safety guard for preventing accidental contact between the operator and the cutting tool of a machine having a work piece table movable towards the cutting tool.

Another object of the present invention is to provide a new and improved cutting tool shield for a machine.

Related objects and advantages of the present invention will be apparent from the following description.

BRIEF DESCRIPTION OF THE DRAWINGS

FIG. 2 is an enlarged cross sectional view of the guard taken along the line 2—2 of FIG. 1 and viewed in the direction of the arrows.

FIG. 3 is an enlarged back view of the guard looking in the direction of arrows 3—3 of FIG. 1.

FIG. 4 is an enlarged cross sectional view taken along the line 4—4 of FIG. 3 and viewed in the direction of the arrows.

FIG. 5 is an enlarged cross sectional view taken along the line 5—5 of FIG. 3 and viewed in the direction of the arrows.

FIG. 6 is an enlarged bottom view of the shield shown in FIG. 1 looking in the direction of arrows 6—6.

DESCRIPTION OF THE PREFERRED EMBODIMENT

Figure 1:
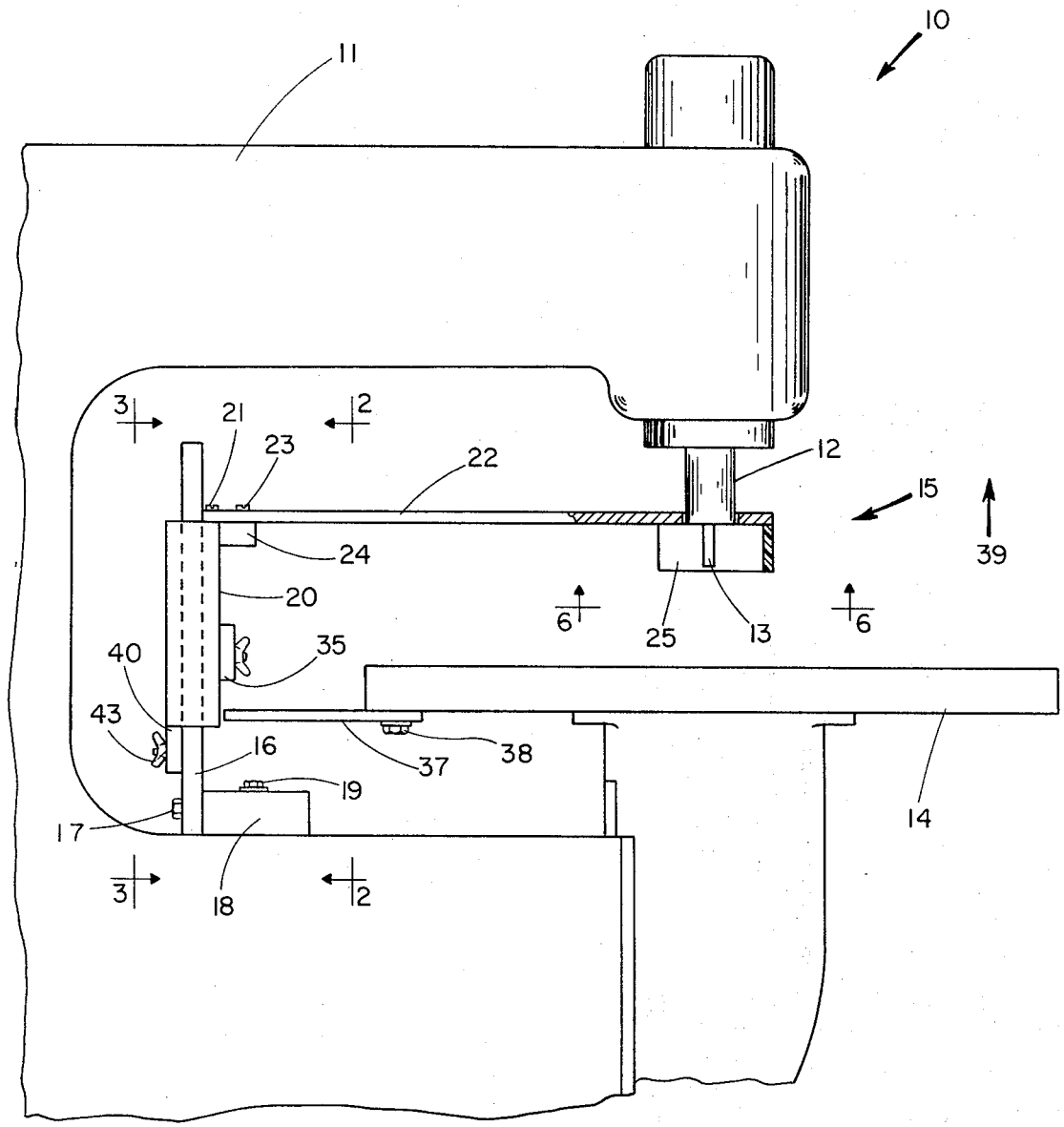
FIG. 1 is a fragmentary side view of a machine incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a router machine 10 such as produced by Onsrud Machine Works, Inc., 7720 North Lehigh Avenue, Niles, Illinois 60648. Router machine 10 has a main frame 11 with a depending vertically movable spindle 12 which holds a cutting tool 13. The router table 14 is vertically movable and is mounted to frame 11. Table 14 supports the work piece and is movable to and from cutting tool 13.

Guard 15 which incorporates the present invention is mounted to the machine and is operable to partially surround cutting tool 13 to prevent accidental engagement of the cutting tool with the operator. A main frame which includes a vertical wall 16 is fixedly mounted by fasteners 17 to block 18 secured to frame 11 by fasteners 19. Slide 20 is movably mounted to wall 16 and is connected by fasteners 21 to a horizontal wall 22 also connected by fasteners 23 to support block 24. As shown in FIG. 6, wall 22 includes a depending radiused vertical wall 25 which extends at least partially around cutting tool 13 which extends through aperture 26 of wall 22 along with spindle 12. Wall 25 is a shield and is produced from clear transparent plastic to allow visual observation of the cutting tool.

Slide 20 is provided with a hollow center through which wall 16 projects. The slide may be constructed in a variety of different configurations such as a pair of parallel walls 28 and 29 secured together by intermediate walls 30 and 31.

Surface 27 of wall 29 is provided with a vertically extending slot 32 which is enlarged at 33 adjacent to vertical wall 16 thereby slidably receiving the head of fastener 34. Fastener 34 extends through stop 35 and is secured thereto by a wing nut 36. Thus, by unloosening nut 36, stop 35 may be positioned along the length of slot 32 and then secured in place.

Flange 37 is fixedly secured by fastener 38 to table 14 and extends immediately under and is contactable with stop 35. Thus, as table 14 moves in the direction of arrow 39, flange 37 will contact stop 35 and lift slide 20 and shield 25 upwardly away from cutting tool 13 allowing the cutting tool to engage the work piece positioned atop table 14.

A second stop 40 is mounted to wall 16 beneath slide 20 and is operable to limit the downward movement of the slide and shield. Wall 16 (FIG. 2) is provided with a slot 41 through which fastener 42 projects. Fastener 42 also projects through stop 40 and is threadedly engaged with wing nut 43. Thus, stop 40 may be adjusted along the length of slot 41 and then secured in place.

Stop 40 is positioned on wall 16 to contact slide 20 when the lower edge of shield 25 is positioned adjacent to the lowest portion of cutting tool 13. In order to adjust stop 35 in the correct position along the length of slide 20, the pattern is first placed on table 14 and the table is raised so that the cutting tool 13 enters the surface of the pattern approximately one-sixteenth of an inch. The work piece to be machined is then placed in the pattern and shield 25 is adjusted so as to be approximately one-sixteenth of an inch above the work piece. The shield is then locked in place by adjusting stop 35 to contact flange 37 with the stop 35 then being locked in place. Thus, additional upward travel of table 14 will cause the slide and shield to move upwardly.

It will be obvious from the above description that the present invention provides a guard for a machine having a cutting tool with a movable work piece table. It will be further obvious from the above description that the present invention provides a new and improved safety shield for a cutting tool.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A guard for a machine having a cutting tool and a movable work piece table comprising:
   a main frame mounted to said machine;
   a slide movably mounted to said main frame;
   a shield mounted on said slide and extending at least partially around said cutting tool;
   first stop means operable to limit downward motion of said slide with respect to said frame; and,
   second means on said slide operable to move said slide and shield upwardly as said table moves upwardly adjacent said cutting tool.

2. The guard of claim 1 wherein:
   said second means includes a flange mounted to said table and a first stop wall movably mounted to said slide, said flange is positioned beneath said first stop wall and contactable therewith to lift said slide and shield as said table moves upwardly.

3. The guard of claim 2 wherein:
   said first stop means includes a second stop wall movably mounted to said frame beneath said slide to limit downward movement of said slide.

4. The guard of claim 3 wherein:
   said shield includes a horizontal wall connected to said slide with a depending radiused vertical wall extending at least partially around said cutting tool which extends through said horizontal wall.

5. The guard of claim 4 wherein:
   said frame includes a first vertically slotted wall with said slide having a second vertically slotted wall, said first slotted wall has a slot with a threaded member slidably mounted thereon extending through and secured to said second stop wall, said second slotted wall has a slot with a threaded member slidably mounted thereon extending through and secured to said first stop wall.

6. The guard of claim 5 wherein:
   said guard includes wing nuts threadedly mounted on the threaded members.

7. The guard of claim 5 wherein:
   said radiused vertical wall is clear transparent plastic allowing visual observation of said cutting tool.

* * * * *